(12) United States Patent
Rastogi et al.

(10) Patent No.: US 6,205,449 B1
(45) Date of Patent: Mar. 20, 2001

(54) SYSTEM AND METHOD FOR PROVIDING HOT SPARE REDUNDANCY AND RECOVERY FOR A VERY LARGE DATABASE MANAGEMENT SYSTEM

(75) Inventors: Rajeev Rastogi, New Providence; Abraham Silberschatz, Summit, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/045,601

(22) Filed: Mar. 20, 1998

(51) Int. Cl.$^7$ .................................................. G06F 17/30
(52) U.S. Cl. ............................................ 707/202; 707/204
(58) Field of Search ...................................... 707/202, 204

(56) References Cited

U.S. PATENT DOCUMENTS

| | | | | |
|---|---|---|---|---|
| 5,140,685 | * | 8/1992 | Sipple et al. ........................ | 711/164 |
| 5,212,789 | * | 5/1993 | Rago ..................................... | 714/16 |
| 5,257,367 | * | 10/1993 | Goodlander et al. ................ | 707/204 |
| 5,388,256 | * | 2/1995 | Herbert ................................. | 707/8 |
| 5,499,337 | * | 3/1996 | Gordon ................................. | 714/6 |
| 5,504,879 | * | 4/1996 | Eisenberg et al. .................. | 707/100 |
| 5,555,404 | * | 9/1996 | Torbjornsen et al. ............... | 707/202 |
| 5,651,133 | * | 7/1997 | Burkes et al. ....................... | 711/114 |
| 5,720,027 | * | 2/1998 | Sarkozy et al. ...................... | 714/6 |
| 5,924,094 | * | 7/1999 | Sutter ................................... | 707/10 |
| 5,933,839 | * | 8/1999 | Hasegawa et al. .................. | 707/204 |
| 5,963,634 | * | 10/1999 | Kantola et al. ..................... | 379/279 |
| 5,991,804 | * | 11/1999 | Bolosky et al. .................... | 709/221 |

\* cited by examiner

*Primary Examiner*—Wayne Amsbury

(57) ABSTRACT

For use with a primary database residing on a primary computer, the primary computer being couplable to a secondary computer having a secondary database, a system for, and method of, allowing the secondary computer to operate as a hot spare for the primary computer and a database management system employing the system or the method. In one embodiment, the system includes: (1) a transaction logger, associated with the primary database, that maintains log records of transactions involving persistent data in the primary database, (2) a transaction processor, associated with the primary database, that transmits at least a portion of the log records to the secondary computer to allow the secondary computer to commit the at least the portion of the log records to the secondary database and (3) parameters, associated with the primary and secondary databases, that designate a state of the primary and secondary computers and indicate relative synchronization of the primary and secondary databases.

19 Claims, 2 Drawing Sheets

SYSTEM AND METHOD FOR PROVIDING HOT SPARE REDUNDANCY AND RECOVERY FOR A VERY LARGE DATABASE MANAGEMENT SYSTEM

CROSS-REFERENCE TO RELATED APPLICATIONS

The present invention is related to those disclosed in U.S. Pat. No. 5,864,849 issued to Bohannon, el al., and entitled "System and Method for Restoring a Multiple Checkpointed Database in View of Loss Of Volatile Memory" and U.S. Pat. No. 5,845,272 issued to Bohannon, el al., and entitled "System and Method for Restoring a Distributed Checkpointed Database." Both patents are commonly assigned with the present invention and incorporated herein by reference for all purposes.

TECHNICAL FIELD OF THE INVENTION

The present invention is directed, in general, to computer systems and, more specifically, to a system and method for providing hot spare redundancy and recovery f or a very large database management system.

BACKGROUND OF THE INVENTION

A database is a collection of data organized usefully and fundamental to some software application (e.g., an information management system). The database is associated with a database manager ("DBM"), which itself is software-based and performs a range of tasks on the database, usually for the software application, the range of tasks varying largely upon the intended use of the database and the sophistication of the DBM.

Traditionally, databases have been stored in non-volatile (disk) memory, while DBMs and software applications have resided, at least in pertinent part, in volatile (main) memory. DBMs have been distinguished by the manner in which they process and manipulate the data with which they are charged. For example, some DBMs only manipulate one data file at a time (flat-file DBMs), others process multiple data files at one time, associating data from several different data files (relational DBMs).

Fundamental DBM operations include storing data, creating indexes that allow retrieval of data, linking data from different files (relational DBMs), etc. Two of the most important operations, and hence most sophisticated, performed by DBMs are data integrity and database recovery.

Data integrity, very simply, insures that one software application cannot modify a particular data file while another software application is relying upon the contents of the same. Database recovery, on the other hand, involves rebuilding the database after part or all of its data is corrupted—data corruption may be caused by a power outage, a program failure or the like that causes the DBM to suspect that at least part of the data stored therein has been lost or damaged.

Today, many software applications require high performance access to data with response time requirements on the order of a few to tens of milliseconds. Traditional non-volatile (disk) memory DBMs have been largely incapable of meeting the high performance needs of such applications (often due to the latency of accessing data that is non-volatile memory-resident).

In an effort to improve performance, the entire database is mapped directly into volatile (main) memory. The data may be accessed either directly by virtual memory pointers, or indirectly via location independent database offsets that quickly translate into memory addresses. Data access using a main memory database is much faster than disk-based storage managers—pages need not be written to disk during normal processing to make space for other pages.

A significant danger exists however if a portion or all of the main memory database becomes corrupted then, unlike non-volatile (disk) memory databases, the entire database may need to be recovered. One recovery approach uses undo log records that are used to track the progress of transactions that have modified the database in some manner. Traditional recovery schemes implement write-ahead logging ("WAL"), whereby all undo logs for updates on a page are "flushed" to disk before the page is flushed to disk. To guarantee trueness, the WAL property and, hence, the recovery method, a latch is held on the page (or possibly on some system log) while the page is copied to disk, and, thus, reintroducing disk memory processing costs as such latching tends to significantly increase access costs to non-volatile memory, increase programming complexity, and interfere with normal processing.

SUMMARY OF THE INVENTION

To address the above-discussed deficiencies of the prior art, the present invention provides, for use with a primary database residing on a primary computer, the primary computer being couplable to a secondary computer having a secondary database, a system for, and method of, allowing the secondary computer to operate as a hot spare for the primary computer and a database management system employing the system or the method. In one embodiment, the system includes a transaction logger, associated with the primary database, that maintains log records of transactions involving persistent data in the primary database. The system further includes a transaction processor, associated with the primary database, that transmits at least a portion of the log records to the secondary computer. Transmission of the portion of the log allows the secondary computer to commit at least a portion of the log records to the secondary database and thereby provide at least partial data redundancy. The system may still further include parameters, associated with the primary and secondary databases, that designate a state of the primary and secondary computers and indicate relative synchronization of the primary and secondary databases. These parameters, if present, can aid in substitution of databases and recovery in the event of system failure.

The present invention therefore introduces the broad concept of employing a database log to synchronize primary and secondary (hot spare) databases. The mechanisms in the log ensure that transmitted transactions contained in the log are applied to both the primary and secondary databases.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
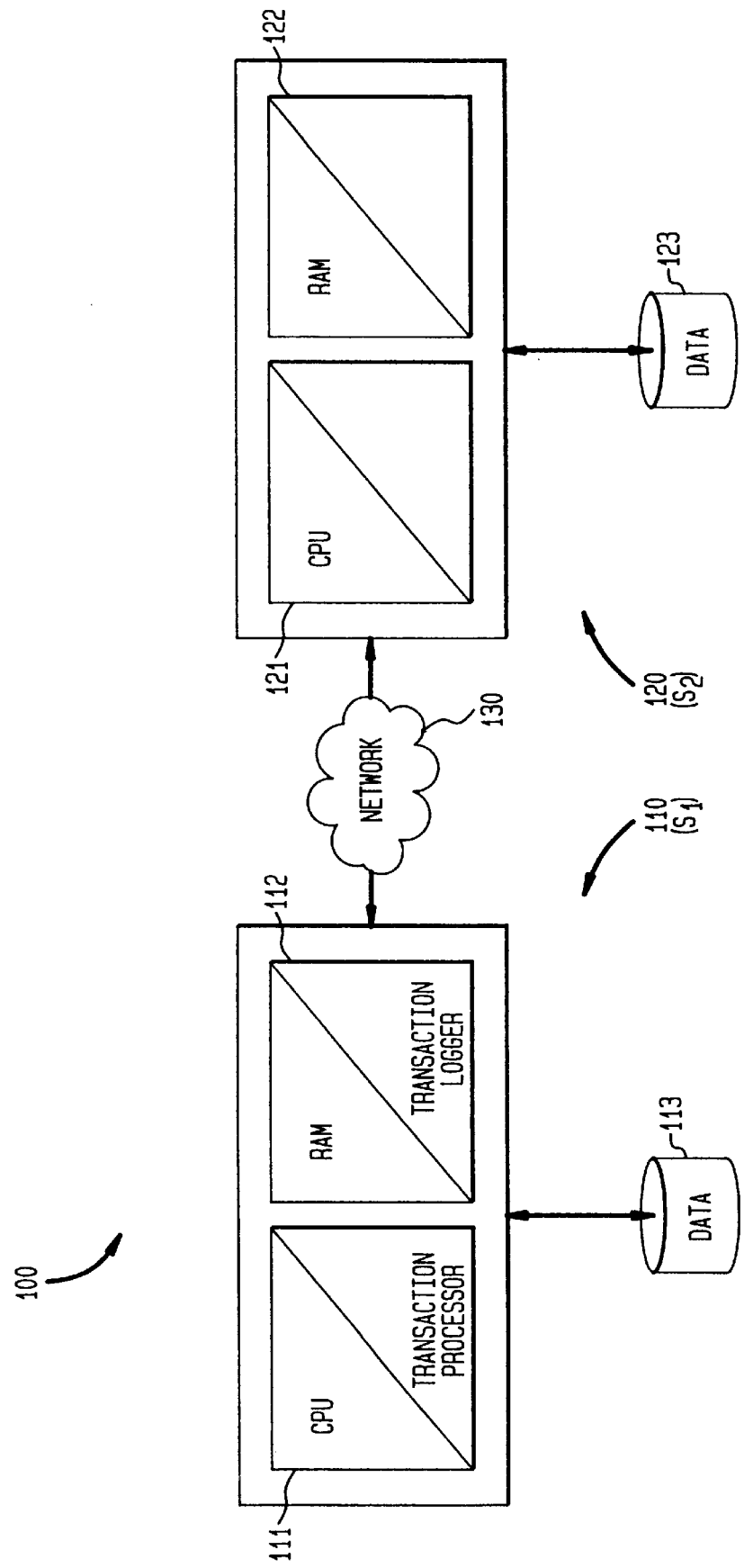
FIG. 1 illustrates a block diagram of an exemplary embodiment of a system with hot spare support, according to the principles of the present invention.

Referring initially to FIG. 1, illustrated is a block diagram of an exemplary embodiment of a system 100 with hot spare support, according to the principles of the present invention. As used herein, a "hot spare" is a secondary system 120 which is run in parallel with a primary system 110. Both the primary system 110 and the secondary system 120 are separate and independent machines. Each of the primary system 110 and secondary system 120 has its own central processing unit ("CPU") 111, 121, random access memory ("RAM") 112, 122, and disk storage 113, 123. Neither system, however, has direct access to the other system's RAM or disk storage. The primary and secondary systems are connected via a network 130, which may be a local area network ("LAN") or a wide area network ("WAN").

In the embodiment illustrated in FIG. 1, the primary system 110 includes a transaction logger that maintains log records of transactions involving persistent data in a primary database. The transaction logger may be a process executable by CPU 111 or dedicated hardware and/or software. The primary system 110 further includes a transaction processor that transmits at least a portion of the log records to the secondary system, or computer, 120. The transaction processor may be a process executable in the CPU 111 or dedicated hardware and/or software. Transmission of a portion of the log allows the secondary system 120 to commit at least a portion of the log records to the secondary database and thereby provide at least partial data redundancy.

The secondary system 120 is synchronized with the primary system 110, for example, via log records communicated through the network 130 from the primary system 110 to the secondary system 120, and is thus available to take over processing immediately (automatically redesignate to function in a primary database mode) if the primary system 110 fails or is disconnected (one type of failure). Thus, the availability of a hot spare improves the overall availability of a system and reduces down time. Without a hot spare, processing would need to be suspended until the primary system 110 could be recovered or brought back online (resolves the failure).

The basic idea is to keep the secondary system 120 in continuous synchronization with the primary system 110. According to the principles of the present invention, the primary system 110 and the secondary system 120 maintain system logs to ensure synchronization. In one embodiment, all updates to persistent data are captured by log records in the system log. Every time the system log is flushed to disk on the primary system 110, it is also communicated to the secondary system 120. The secondary system 120 then applies the log records to its own version of the database. In one embodiment, the actions performed by the secondary system 120 for each log record are identical to those performed when log records are applied during recovery from system failures. For a more detailed discussion of recovery following a system failure, see U.S. Pat. No. 5,864,849 issued to Bohannon, el al. "System and Method for Restoring a Multiple Checkpointed Database in View of Loss Of Volatile Memory" and U.S. Pat. No. 5,845,272 issued to Bohannon, el al. and entitled "System and Method for Restoring a Distributed Checkpointed Database." Both of these patents are commonly assigned with the present invention and are incorporated herein by reference.

According to the principles of the present invention, commit processing can be handled at the primary system 110 in one of two exemplary ways. The exemplary ways are referred to herein as "1-safe" and "2-safe" approaches. Using the 1-safe approach, the primary system 110 commits a transaction locally without waiting for an acknowledgement from the secondary system 120 that the secondary has committed the transaction at its site. As a result, it is possible for a transaction to be committed at the primary system 110 but not at the secondary system 120. Thus, if it becomes necessary for the secondary system 120 to take over from the primary system 110, certain committed transactions may have to be rolled back. Using the 2-safe approach, the primary system 110 commits a transaction locally only after an acknowledgement is received from the secondary system 120 that it has committed the transaction. As a result, it is possible for certain transactions to be committed at the secondary system 120 but not at the primary system 110. Thus, certain transactions that may be aborted at the primary system 110 may still get committed at the secondary system 120.

Those skilled in the art will note that, in using the 1-safe approach, a system user could experience a situation in which a transaction that had been committed by the system is later rolled back. As a result, the "durability" property may not hold with the 1-safe approach. With the 2-safe approach, however, the durability property always holds, since the system does not return a committed indication to a user until a transaction has been committed at both the primary and secondary systems 110, 120. The 2-safe approach does, however, incur additional overhead, since a response to a commit to the user is delayed until the commit records have hit stable storage at both the primary and secondary systems 110, 120.

The fact that a transaction can be committed at one of the primary system 110 or the secondary system 120 and not at the other introduces some serious problems in keeping both the primary and secondary systems 110, 120 synchronized, as illustrated by two scenarios using the 1-safe and 2-safe approaches. In a first scenario, using the 1-safe approach, the primary system 110 commits a transaction T and fails before the secondary system 120 receives the log records. As a result, the secondary system 120 takes over without the transaction T being committed. When the primary system 110 is brought back online (having resolved its failure), it automatically redesignates to function in a secondary database mode and attempts to attach as a secondary system. It is then necessary to undo T's effect to maintain synchronization between the two systems. In a second scenario, using the 2-safe approach, a transaction T commits at the secondary system 120 but not at the primary system 110 and, before T can commit at the primary system 110, both the primary system 110 and the secondary system 120 fail. In this situation, it is necessary to be careful that when the primary and secondary systems 110, 120 are both brought back online, T's effects are erased form the log of the secondary system 120.

In the description that follows, detailed protocols are disclosed for (1) the attaching of a secondary system to a primary system, (2) a secondary system to take over from a primary system and (3) the recovery of both primary and secondary systems from system fails. The protocols described herein are quite general and permit the primary system to be recovered as a secondary system, or vice versa. Thus, if a primary system is unavailable following a failure of both the primary and the secondary systems, then the secondary system can be recovered as a primary system and the primary system, when it becomes available, can be recovered as a secondary system. The only constraint imposed by the protocols described hereinafter is that a user must be careful not to start off both systems in primary mode or secondary mode, e.g., if a system is already running in primary mode, a user should not start up the other system in primary mode also.

In one embodiment, the following three variables are stored persistently on both systems: state, sec_syncd, and eol_before_sync. The state variable stores the most current state of a system. The state of a system can be either "primary," "secondary" or "none." The sec_syncd variable is used to keep track of whether or not the secondary system 120 has synchronized with the primary system 110. The sec_syncd variable has a value of "0" if the secondary system 120 is not yet synchronized with the primary system 110 or a value of "1" if the secondary system 120 is synchronized with the primary system 110. The eol_before_sync variable is used to keep track of the end of a "stable log" at the primary system 110. The end of the stable log corresponds in time to the earliest time at which the primary system 110 assumed control, such that after that time the secondary system 120 has not synchronized with it. The sec_syncd variable is only meaningful when the state of a system is "primary," and the eol_before_sync variable is only meaningful when sec_syncd is "0" and the state of the system is "primary."

In one embodiment, if the primary system 110 fails, and the secondary system 120 detects the failure, the secondary system 120 can simply perform actions that it would normally perform during the final phase of recovery processing, e.g., rolling back active transactions and executing post commit actions for committed transactions. The secondary system 120 then registers itself as the primary system by automatically changing its state variable to "primary," setting sec_syncd to "0" and eol_before_sync to the location of the end of the last log record (in its stable log) that it received from the primary system 110 before taking over. In an alternate embodiment, instead of writing the variables atomically, it may suffice to write them in the order: (1) eol_before_sync, (2) sec_syncd and (3) state. The secondary system 120 can then begin normal processing.

At system startup, an optional parameter can specify whether a system is to be initially configured as "primary" or "secondary." If no parameter is specified, the mode for a system is advantageously established to be the same as that when the system last failed. The last state can be obtained from the state variable that is stored persistently with the system. In a related embodiment, a system whose state is "none" cannot be started up as a primary system. It can only be started up as a secondary system.

If the system is started up in a primary mode, it is determined whether any of the following conditions are true:

1. whether the state of the system is "secondary;" i.e., the system was last in "secondary" mode,
2. whether the state of the system is "primary" and sec_sycnd is "1."

If either of the foregoing conditions is true, then, persistently and atomically, state is set to "primary," sec_syncd is set to "0" and eol_before_sync is set to the location of the end of the stable log at the site before the system recovers the database. The above updates are advantageously performed after the database at the site has been recovered.

Whereas either system 110, 120 may be configured as a primary or secondary system, the systems may be referred to generally as $s_1$ and $s_2$, respectively. If the system $s_2$ is started up in secondary mode and its state is "none," then it is simply "reinitialized" as described hereinafter. Otherwise, the system connects to the primary system (e.g., system $s_1$) to obtain min_eol$_i$, where min_eol$_i$ is defined as follows:

1. If states is "primary" and sec_syncd$_i$ is "0," then min_eol$_i$ is eol_before sync$_i$; else,
2. min_eol$_i$ is simply eol$_i$ (i.e., the end of the stable log at site i), where the subscript notation is used to denote the site that contains the variables. System $s_2$ then sets trunc_eol to min(min_eol$_1$, min_eol$_2$), and synchronizes its stable log with the primary system's stable log. To synchronize the stable log of system $s_2$ with the primary's stable log, the following operations are performed:

1. If trunc_eol is less than $s_2$'s eol, and the portion of the stable log following trunc_eol cannot be truncated, then $s_2$'s state variable is changed to "none" and $s_2$ is "re-initialized," as described hereinafter. The portion of the log following trunc_eol can be deleted/truncated at $s_2$ if the eol recorded after the active transaction table ("ATT," described hereinafter) checkpointed is less than or equal to trunc_eol. If it is determined that the portion of the log following trunc_eol can be deleted, then $s_2$ truncates its log and ships trunc_eol to $s_1$ (i.e., the primary system).
2. The primary system then checks to see if no portion of the log following trunc_eol has been truncated at its site. If this is true, then the primary system simply starts shipping log records to the secondary system $s_2$ from trunc_eol onwards. It also sets sec_syncd to "1" persistently. The secondary system, in turn, recovers the databases by applying log records in its stable log until trunc_eol and then begins applying the log records that it receives from the primary system. It also persistently notes its state as "secondary."
3. If, however, certain log records following trunc_eol, at the primary system $s_1$ have been truncated, then the secondary system is re-initialized after setting its state to "none." To re-initialize the secondary system, the primary system preferably transmits the entire database to the secondary system, which can be obtained by performing a conventional archive operation, and only log records following start_eol, which is the minimum needed log start point for recovering from the archive. The secondary system restores its entire database, including ATT, from the archive and then begins applying log records shipped to it by the primary system. The log records are appended to the secondary system's stable log beginning from start_eol. Re-initialization is completed at the secondary system once all log records between start_eol and the eol stored with the ATT have been transferred to stable storage at the secondary system. Once re-initialization is complete, the secondary system sets its state to "secondary" and the primary system sets sec_syncd to "1."

From the foregoing, several simple observations can be made that hold true at every point during the execution of the system.

1. For at least one of the two systems, state is "primary."
2. It is never the case that state is "primary" and sec_syncd is "1" for both systems.
3. If neither of the systems has state set to "none," then the portion of the log at both systems is identical until min (min_eol$_1$, min_eol$_2$)

For the 2-safe approach, the conditions that need to hold so that no committed transactions need to be rolled back can be identified as follows:

1. Of the two systems, the system with state equal to "primary" and sec_syncd equal to "0" is always the one that is started up in "primary" mode.

2. A system with state set to "primary" and sec_syncd equal to "1" can be started up in "primary" mode only if either the state of the other system is "secondary," or the state of the other system is not "primary" with sec_syncd equal to "0."

The foregoing conditions ensure that two sites in the "primary" state with sec_syncd equal to "0" can never exist.

For purposes of completeness, the following provides a description of multi-level recovery concepts and a single-site main memory recovery scheme. The centralized scheme described hereinafter is an overview of the scheme presented in the above-cited U.S. Pat. No. 5,845,272 issued to Bohannon, el al. That scheme also addresses multi-level recovery and a fuzzy checkpointing method in which only dirty pages are written.

Using the multi-level recovery scheme, data is logically organized into "regions." A region can be a tuple, an object or an arbitrary data structure like a list or a tree. Each region has a single associated lock with exclusive ("X") and shared ("S") modes, referred to as a "region lock," that guards accesses and updates to the region.

Multi-level recovery provides recovery support for enhanced concurrency based on the semantics of operations. Specifically, multi-level recovery permits the use of weaker "operation" locks in place of stronger shared/exclusive region locks. A common example of the use of region locks is index management, where holding physical locks until transaction commit leads to unacceptably low levels of concurrency. If undo logging has been done physically, e.g., recording exactly which bytes were modified to insert a key into the index, then the transaction management system must ensure that the physical undo descriptions are valid until transaction commit. Since the descriptions refer to specific updates at specific positions, this typically implies that the region locks on the updated index nodes be held to ensure correct recovery, in addition to considerations for concurrent access to the index.

The multi-level recovery approach is to replace low-level physical undo log records with higher level logical undo log records containing undo descriptions at the operation level. Thus, for an insert operation, physical undo records would be replaced by a logical undo record indicating that the inserted key must be deleted. Once this replacement is made, the region locks may be released and only the less restrictive operation locks are retained. For example, region locks on the particular nodes involved in an insert can be released, while an operation lock on the newly inserted key that prevents the key from being accessed or deleted is held.

Figure 2:
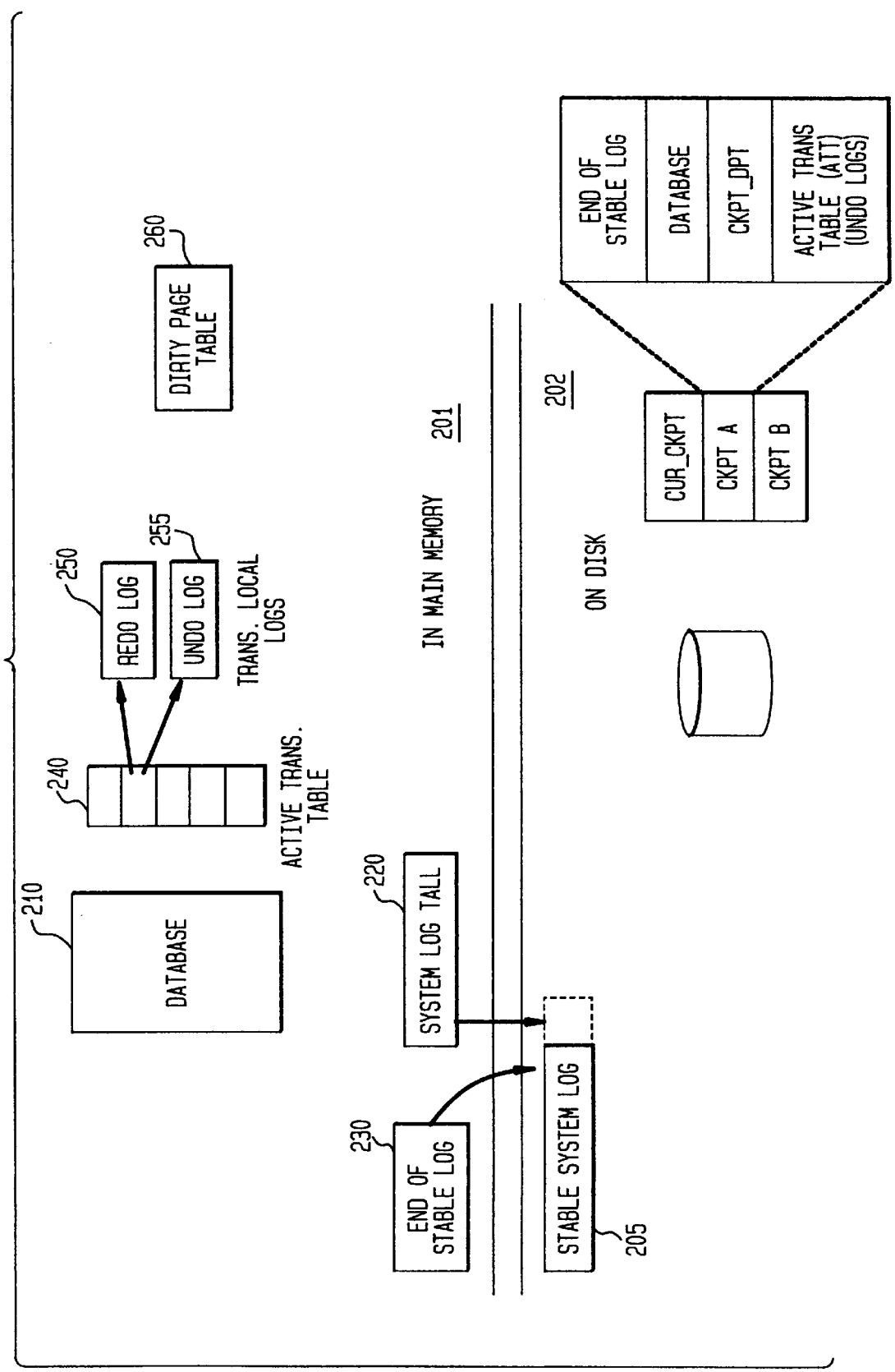
FIG. 2 illustrates an exemplary architecture of the data structures used for recovery purposes.

Turning now to FIG. 2, illustrated is an exemplary architecture of the data structures used for recovery purposes. The database 210, which may be a sequence of fixed size pages, is mapped into the address space of each process and is located in main memory 201, with two checkpoint images Ckpt_A and Ckpt_B located on disk 202. Also stored on disk 202 are cur_ckpt, an "anchor" pointing to the most recent valid checkpoint image for the database, and a single system log, containing redo information, having a stable system log portion 205 on disk 202 and a tail 220 in main memory 201. The variable end_of_stable_log 230 stores a pointer into the system log such that all records prior to the pointer are known to have been flushed to the stable system log 205.

A single ATT 240 stores a redo log 250 and undo log 255 for active transactions. A dirty page table ("dpt") 260, maintained in main memory 201, records the pages that have been updated since the last checkpoint. The ATT, with undo logs, and the dirty page table are also stored with each checkpoint. The dirty page table in a checkpoint is referred to as ckpt_dpt.

"Transactions," in the model described herein, consist of a sequence of operations. It is assumed that each operation has a level $L_i$ associated with it. An operation at level $L_i$ can consist of a sequence of operations at level $L_{i-1}$. Transactions, which are assumed to be at level $L_n$, call operations at level $L_{n-1}$. Physical updates to regions are level $L_0$ operations. Transactions can be distinguished as "pre-commit," e.g., when the commit record enters the system log in memory establishing a point in the serialization order, and "commit," e.g., when the commit record hits the stable log. The same terminology can be used for operations, where only the pre-commit point is meaningful, though this can also be referred to as an "operation commit."

Each transaction obtains an "operation" lock before an operation executes (the lock is granted to the operation if it commutes with other operation locks held by active transactions), and $L_0$ operations must obtain region locks. The locks on the region are released once the $L_1$ operation pre-commits. An operation lock at level $L_i$, however, is held until the transaction or the containing operation (at level $L_{i+1}$) pre-commits. Thus, all the locks acquired by a transaction are released once it pre-commits.

The recovery algorithm maintains a separate undo log 255 and redo log 250 in main memory 201 for each transaction. In one embodiment, the logs are stored as a linked list off an entry for the transaction in the ATT 240. Each update (to a part of a region) generates physical undo and redo log records that are appended to the transaction's undo and redo logs, respectively. When a transaction/operation pre-commits, all the redo log records for the transaction in its redo log are appended to the system log, and the logical undo description for the operation is included in the operation commit log record in the system log. Thus, with the exception of logical undo descriptors, only redo records are written to the system log during normal processing.

In addition, when an operation pre-commits, the undo log records for its suboperations/updates are deleted from the transaction's undo log and a logical undo log record containing the undo description for the operation is appended. In-memory undo logs of transactions that have pre-committed are deleted since they are not required again. Locks acquired by an operation/transaction are released once the operation/transaction pre-commits.

The system log is flushed to disk when a transaction commits. Pages updated by every redo log record written to disk are marked dirty in the dirty page table 260 by the flushing procedure. In the recovery scheme described herein, update actions do not obtain latches on pages. Instead, region locks ensure that updates do not interfere with each other. In cases when region sizes change, certain additional region locks on storage allocation structures may need to be obtained. For example, in a page based system, if an update causes the size of a tuple to change, then in addition to a region lock on the tuple, an X mode region lock on the storage allocation structures on the page must be obtained. In addition, actions that are normally taken on page latching, such as setting of dirty bits for the page, are now performed based on log records written to the redo log 250. The redo log 250 is used as a single unifying resource to coordinate the applications interaction with the recovery system.

Consistent with the terminology in main memory databases, the term "checkpoint" is defined to mean a copy of main memory 201, stored on disk 202, and "checkpointing" refers to the action of creating a checkpoint.

Many conventional recovery schemes implement write-ahead logging ("WAL"), whereby all undo logs for updates on a page are flushed to disk before the page is flushed to disk. To guarantee the WAL property, a latch on the page (or possibly on the system log) is held while copying the page to disk. In the novel recovery scheme described herein, latches are eliminated on pages during updates, since latching can significantly increase access costs in main memory. Latching can also interfere with normal processing, in addition to significantly increasing programming complexity. As a result, however, it is not possible to enforce the write-ahead logging policy, since pages may be updated even as they are being written out.

For correctness, in the absence of write-ahead logging, two copies of the database images are stored on disk, and alternate checkpoints write dirty pages to alternate copies. This strategy, called "ping-pong checkpointing," permits a checkpoint that is being created to be temporarily inconsistent, i.e., updates may have been written out without corresponding undo records having been written. After writing out dirty pages, however, sufficient redo and undo log information is advantageously written out to bring the checkpoint to a consistent state. Thus, even if a failure occurs while creating one checkpoint, the other checkpoint is still consistent and can be used for recovery.

Those skilled in the art will recognize that keeping two copies of a main memory database on disk for ping-pong checkpointing does not have a very high space penalty, since disk space is much cheaper than main memory. As described hereinafter, however, there is an input/output ("I/O") penalty because dirty pages have to be written out to both checkpoints even if there was only one update on the page. This penalty, however, is small for hot pages, and the benefits outweigh the I/O cost for typical main memory database applications.

Before writing any dirty data to disk, the checkpoint notes the current end of the stable log in the variable end_of_stable_log (which is stored with the checkpoint). This is the start point for scanning the system log when recovering from a failure using this checkpoint. Next, the contents of the (in-memory) Ckpt_dpt are set to those of the dpt and the dpt is zeroed. The noting of end_of_stable_log and zeroing of dpt are done atomically with respect to flushing. The pages written out are the pages that were either dirty in the ckpt_dpt of the last completed checkpoint, dirty in the current (in-memory) ckpt_dpt or dirty in both. In other words, all pages that were modified since the current checkpoint image was last written, namely, pages that were dirtied since the last-but-one checkpoint, are written out. This is necessary to ensure that updates described by log records preceding the current checkpoint's end_of_stable_log have made it into the database image in the current checkpoint.

Checkpoints write out dirty pages without obtaining any latches and thus without interfering with normal operations. This "fuzzy" checkpointing is possible since physical redo log records are generated by all updates. These are used during restart recovery and their effects are idempotent. For any uncommitted update whose effects have made it to the checkpoint image, undo log records are written out to disk after the database image has been written. This is performed by checkpointing the ATT after checkpointing the data. The checkpoint of the ATT writes out undo log records, as well as other status information.

At the end of checkpointing, a log flush must be done before declaring the checkpoint completed (and consistent) by toggling cur_ckcp to point to the new checkpoint. This is because undo logs are deleted on transaction/operation pre-commit, which may happen before the checkpoint of the ATT. If the checkpoint completes, and the system then fails before a log flush, then the checkpoint may contain uncommitted updates for which there is no undo information. The log flush ensures that the transaction/operation has committed, and so the updates will not have to be undone (except perhaps by a compensating operation, for which undo information will be present in the log).

When a transaction aborts, i.e., fails to complete execution successfully, updates/operations described by log records in the transaction's undo log are undone by traversing the undo log sequentially from the end. Transaction abort is carried out by executing, in reverse order, every undo record as if the execution were part of the transaction.

Following a philosophy of "repeating history," new physical redo log records are advantageously created for each physical undo record encountered during an abort. Similarly, for each logical undo record encountered, a new "compensation" or "proxy" operation is executed based on the undo description. Log records for updates performed by the operation are generated the same as log records during normal processing. Furthermore, when a proxy operation commits, all its undo log records are deleted along with the logical undo record for the operation that was undone. The commit record for a proxy operation serves a purpose that may be described by the term "compensation log record" ("CLR"), e.g., when the commit record is encountered during restart recovery, the logical undo log record for the operation that was undone is deleted from the transaction's undo log, thus preventing the operation from being undone again.

The last issue to be addressed herein is recovery. In a restart recovery, after initializing the ATT and transaction undo logs with the ATT and undo logs stored in the most recent checkpoint, the database image is loaded and dpt is set to zero. As part of the checkpoint operation, the end of the system log on disk is noted before the database image is checkpointed, and becomes the "begin-recovery-point" for this checkpoint once the checkpoint has completed. All updates described by log records preceding this point are guaranteed to be reflected in the checkpointed database image. Thus, during restart recovery, only redo log records following the begin-recovery-point for the last completed checkpoint of the database are applied, with appropriate pages in dpt being set to dirty for each log record. During the application of redo log records, necessary actions are taken to keep the checkpointed image of the ATT consistent with the log as it is applied. These actions mirror the actions taken during normal processing. For example, when an operation commit log record is encountered, lower level log records in the transaction's undo log for the operation are replaced by a higher level undo description.

Once all the redo log records have been applied, the active transactions are rolled back. To do this, all completed operations that have been invoked directly by the transaction, or have been directly invoked by an incomplete operation have to be rolled back. The order in which operations of different transactions are rolled back, however, is very important, so that an undo at level $L_i$ sees data structures that are consistent. First, all operations, across all transactions, at $L_0$ that must be rolled back are rolled back, followed by all operations at level $L_1$, then $L_2$, etc.

Those skilled in the art will recognize that for certain uncommitted updates present in the redo log, undo log records may not have been recorded during the checkpoint. This could happen, for instance, when an operation executes and commits after the checkpoint, and the containing transaction has not committed. This is not a problem, however, since the undo description for the operation would have been found earlier during recovery in operation commit log records during the forward pass over the system log. Any redo log records for updates performed by an operation whose commit log record is not found in the system log are ignored, since the records must be due to a failure during flush and are at the tail of the system log.

Although the present invention has been described in detail, those skilled in the art should understand that they can make various changes, substitutions and alterations herein without departing from the spirit and scope of the invention in its broadest form.

What is claimed is:

1. For use with a primary database residing on a primary computer, said primary computer being couplable to a secondary computer having a secondary database, a system for allowing said secondary computer to operate as a hot spare for said primary computer, comprising:
    a transaction logger, associated with said primary database, that maintains log records of transactions involving persistent data in said primary database; and
    a transaction processor, associated with said primary database, that transmits a portion of said log records to said secondary computer to allow said secondary computer to commit said portion of said log records to said secondary database, said secondary database being able to, upon failure of said primary database, automatically redesignate to function in a primary database mode, said primary database being able to, upon resolution of said failure, automatically redesignate to function in a secondary database mode.

2. The system as recited in claim 1 wherein said transaction processor transmits all of said log records to said secondary computer to allow said secondary computer to commit said all of said log records to said secondary database, said secondary database thereby mirroring said primary database.

3. The system as recited in claim 1 wherein said transaction processor commits one of said log records without waiting until said secondary computer has acknowledged having committed said one of said log records.

4. The system as recited in claim 1 wherein said transaction processor waits to commit one of said log records until said secondary computer has acknowledged having committed said one of said log records.

5. The system as recited in claim 1 wherein said transaction logger maintains said log records in a primary stable log, said secondary computer capable of synchronizing to said primary stable log.

6. The system as recited in claim 1 wherein a computer network couples said primary and secondary computers.

7. For use with a primary database residing on a primary computer, said primary computer being couplable to a secondary computer having a secondary database, a method of allowing said secondary computer to operate as a hot spare for said primary computer, comprising the steps of:
    maintaining log records of transactions involving persistent data in said primary database;
    transmitting a portion of said log records to said secondary computer to allow said secondary computer to commit said portion of said log records to said secondary database;
    designating a state of said primary and secondary computers with a first parameter associated with said primary and secondary databases;
    automatically redesignating said secondary database to function in a primary database mode upon failure of said primary database; and
    automatically redesignating said primary database to function in a secondary database mode upon resolution of said failure.

8. The method as recited in claim 7 wherein said step of transmitting comprises the step of transmitting all of said log records to said secondary computer to allow said secondary computer to commit said all of said log records to said secondary database, said secondary database thereby mirroring said primary database.

9. The method as recited in claim 7 further comprising the step of committing one of said log records without waiting until said secondary computer has acknowledged having committed said one of said log records.

10. The method as recited in claim 7 further comprising the step of waiting to commit one of said log records until said secondary computer has acknowledged having committed said one of said log records.

11. The method as recited in claim 7 further comprising the step of automatically redesignating said primary database to function in a secondary database mode upon resolution of said failure.

12. The method as recited in claim 7 further comprising the step of maintaining said log records in a primary stable log, said secondary computer capable of synchronizing to said primary stable log.

13. The method as recited in claim 7 wherein said step of transmitting is carried out over a computer network coupling said primary and secondary computers.

14. A database management system (DBMS), comprising:
    a primary database residing on a primary computer;
    a secondary database residing on a secondary computer coupled to said primary computer; and
    a system that allows said secondary database to mirror said primary database, including:
    a transaction logger, associated with said primary database, that maintains log records of transactions involving persistent data in said primary database, and
    a transaction processor, associated with said primary database, that transmits a portion of said log records to said secondary computer to allow said secondary computer to commit said portion of said log records to said secondary database, said secondary database thereby mirroring said primary database, said secondary database being able to, upon failure of said primary database, automatically redesignate to function in a primary database mode, said primary database being able to, upon resolution of said failure, automatically redesignate to function in a secondary database mode.

15. The DBMS as recited in claim 14 wherein said transaction processor commits one of said log records without waiting until said secondary computer has acknowledged having committed said one of said log records.

16. The DBMS as recited in claim 14 wherein said transaction processor waits to commit one of said log records until said secondary computer has acknowledged having committed said one of said log records.

17. The DBMS as recited in claim 14 wherein said transaction logger maintains said log records in a primary stable log, said secondary computer capable of synchronizing to said primary stable log.

18. The DBMS as recited in claim 14 wherein a computer network couples said primary and secondary computers.

19. The DBMS as recited in claim 14 wherein said transaction processor transmits all of said log records to said secondary computer to allow said secondary computer to commit said all of said log records to said secondary database, said secondary database thereby mirroring said primary database.

* * * * *